United States Patent [19]

Morishita

[11] 4,191,343

[45] Mar. 4, 1980

[54] SPINNING REEL WITH IMPROVED DRAG AND SPOOL OSCILLATION MECHANISMS

[75] Inventor: Yasomatsu Morishita, Kure, Japan

[73] Assignee: Ryobi, Ltd., Fuchu, Japan

[21] Appl. No.: 945,993

[22] Filed: Sep. 26, 1978

[30] Foreign Application Priority Data

Jul. 20, 1976 [JP] Japan ............................. 51-97125[U]

[51] Int. Cl.² .............................................. A01K 89/01
[52] U.S. Cl. .............................. 242/84.21 R; 242/219
[58] Field of Search ................ 242/84.21 R, 84.21 A, 242/84.26, 84.2 R, 84.51 R, 84.5 A, 217–219

[56] References Cited

U.S. PATENT DOCUMENTS

| 2,777,645 | 1/1957 | Wood | 242/84.21 R |
| 2,858,087 | 10/1958 | Giamo et al. | 242/84.21 R |
| 3,224,703 | 12/1965 | Clark | 242/84.21 A |
| 3,967,791 | 7/1976 | Morishita | 242/84.21 R |

FOREIGN PATENT DOCUMENTS

| 1184698 | 2/1959 | France | 242/84.21 R |
| 694177 | 9/1965 | Italy | 242/84.21 R |

*Primary Examiner*—Billy S. Taylor
*Attorney, Agent, or Firm*—Sughrue, Rothwell, Mion, Zinn and Macpeak

[57] ABSTRACT

A spinning reel including a drag mechanism for providing a controlled amount of frictional force between an anti-reversing gear and a rotor drive wheel connected to the rotor. A disc member is provided on the side of the rotor drive wheel opposite the anti-reversing gear. The disc member is adapted to urge the rotor drive wheel toward the anti-reversing gear against the force of a spring member to thereby control the rotation of the rotor drive wheel when the anti-reversing gear is locked. Spool oscillation is effected by a gear disposed parallel to the rotor drive wheel and on the opposite side of the spool shaft therefrom, and driven by the rotor pinion. An eccentric pin or projection is provided on this gear, and slides transversely in a groove in a T-shaped oscillator piece secured to the axially slidable spool shaft as the reel handle is turned, to thereby reciprocate or oscillate the spool.

7 Claims, 2 Drawing Figures

SPINNING REEL WITH IMPROVED DRAG AND SPOOL OSCILLATION MECHANISMS

BACKGROUND OF THE INVENTION

The invention relates to a spinning reel, and more particularly to a spinning reel having improved drag and spool oscillation mechanisms.

Conventional spinning fishing reels, which include a rotor and a spool provided for slipping rotation relative to the main rod through a drag mechanism, have been disadvantageous in that the fishing line is twisted when wound around the spool and is released from the spool with the twist remaining on the fishing line under drag operation.

In order to overcome such a disadvantage, spinning reels of another type have been proposed in the art which include a fixed spool and a rotor provided for slipping rotation so that the fishing line can be untwisted when released from the spool under drag operation.

The spool oscillation or reciprocation mechanisms of the prior art spinning reels have also been characterized by relatively complex designs which are both difficult and costly to manufacture, and which are prone to jamming in use—particularly when the reel parts become worn.

SUMMARY OF THE INVENTION

It is an object of the present invention to provide an improved spinning reel which will be very simple and rugged in structure.

Another object of the present invention is to provide an improved spinning reel which can untwist the fishing line when it is released from the spool under drag operation.

Still another object of the present invention is to provide an improved spinning reel having a delicate drag operation and a simplified spool oscillation mechanism.

These objects are accomplished in the present invention by providing a spinning reel comprising a reel housing, a hollow shaft rotatably supported by the housing, the hollow shaft having its one end formed within the housing with an anti-reversing gear and a support disc extending inwardly from the gear and having a diameter less than that of the gear, said hollow shaft having the other end thereof fixed to a handle, a drag control shaft slidably supported in the hollow of the hollow shaft, the control shaft having its inner end formed with a disc member facing the anti-reversing gear, a rotor drive wheel interposed between the anti-reversing gear and the disc member through drag washers disposed in the opposite sides of the rotor drive wheel, the rotor drive wheel and the washers supported by the support disc, resilient means disposed between one of the washers and the disc member for spring biasing the disc away from the anti-reversing gear, and a drag control knob fastened to the outer end of the drag control shaft for bringing the rotor drive wheel into frictional engagement with the anti-reversing gear through the drag washers.

Spool oscillation is effected by a gear disposed parallel to the rotor drive wheel and on the opposite side of the spool shaft therefrom, and driven by the rotor pinion. An eccentric pin or projection is provided on this gear, and slides transversely in a groove in a T-shaped oscillator piece secured to the axially slidable spool shaft as the reel handle is turned, to thereby reciprocate or oscillate the spool.

DETAILED DESCRIPTION OF THE PREFERRED EMBODIMENT

Figure 1:
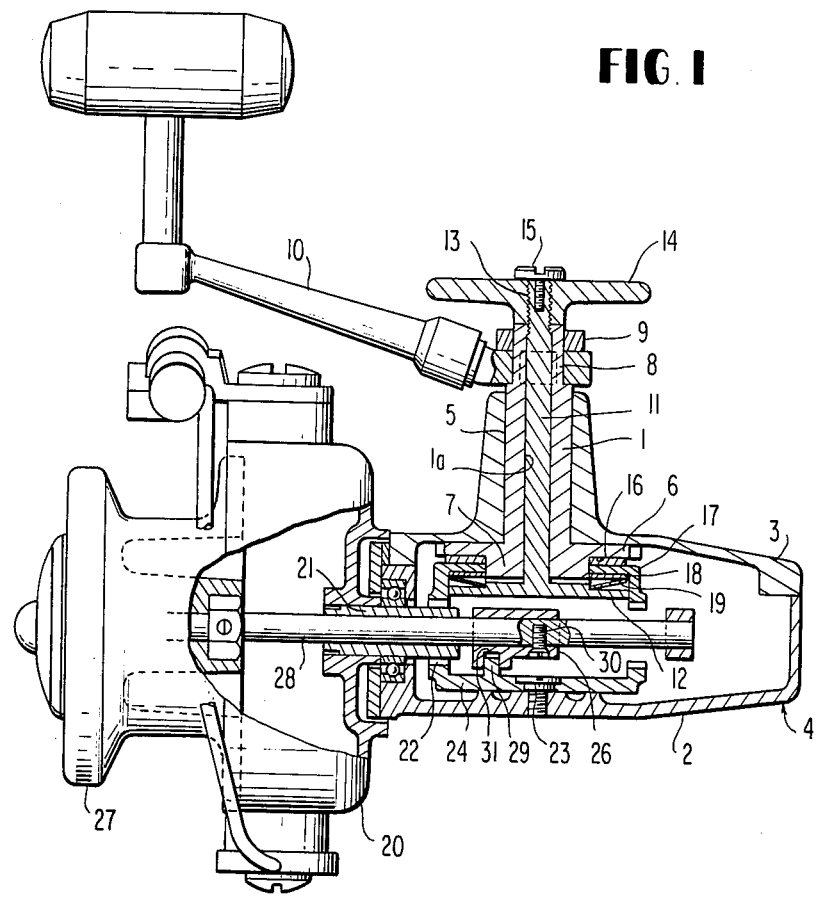
FIG. 1 shows a partially cut away plan view of a spinning reel in accordance with the present invention.

In FIG. 1, reference numeral 4 indicates a reel housing having a body 2 and a cover 3 fitted on the body 2 and formed with a hollow boss 5. A hollow shaft 1 is inserted in and rotatably supported by the hollow boss 5. The hollow shaft 1 has its one end formed within the reel housing 4 with an anti-reversing gear 6 and a support disc 7 having a diameter less than that of the gear 6 and extending inwardly from and coaxially with the gear 6. The anti-reversing gear 6 is adapted to be selectively engaged with a pawl or other stop means (not shown) to prevent the gear 6 from reverse rotation. The other end of the hollow shaft 1 extends from the hollow boss 5 and is formed with a threaded portion 8 with which a nut 9 is threadingly engaged so as to fasten a handle 10 thereto.

In the hollow 1a of the hollow shaft 1 there is inserted a drag control shaft 11 having its one end formed within the reel housing with a disc portion 12 and the other end thereof formed with a threaded portion 13 with which a drag control knob 14 is engaged. The drag control knob 14 is fastened to the control shaft 11 by a screw 15, so that the drag control knob is in contact with the end of the hollow shaft 1. This is effective to prevent any excessive force from being exerted on the bearing portion and to provide a high degree of mechanical accuracy over a long period of time. In addition, such an arrangement of the drag control knob 14 outside the handle 10 permits easy drag operation and reel assembly.

The anti-reversing gear 6 and the disc member 12 are spaced apart, and between them is interposed a toothed rotor drive wheel 17 supported by the support disc 7. Drag washers 16 and 18 are disposed on the opposite sides of the rotor drive wheel. The drag washer 16 serves to prevent the rotor drive wheel 17 from free rotation relative to the anti-reversing gear 6. A spring member such as a circular leaf spring 19 is interposed between drag washer 18 and the disc member 12 for biasing the rotor drive wheel 17 away from the disc member 12 so that the drag control knob 14 abuts against the outer end of the hollow shaft 1. Thus, when the drag control knob is threadingly advanced, the disc 12 presses the rotor drive wheel 17 through the drag washers toward the anti-reversing gear 6 against the force of the spring member 19 to thereby provide a controlled amount of frictional force between the anti-reversing gear 6 and the rotor drive wheel 17 to restrict the slipping rotation of the rotor drive wheel. Such an arrangement permits a delicate drag operation.

Figure 2:
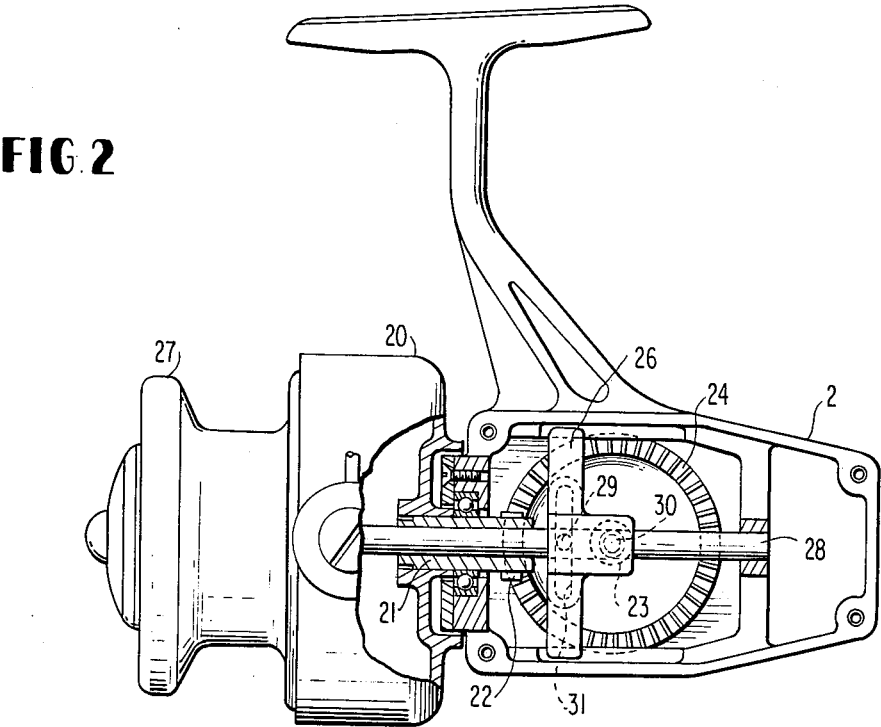
FIG. 2 shows a partial elevation view of the oscillation mechanism of FIG. 1.

The rotor drive wheel 17 is in mesh with a pinion 22 provided on a hollow shaft 21 secured to a rotor 20, and the pinion 22 is in mesh with a toothed oscillator wheel 24 rotatably secured to the side wall of the reel housing 4 by means of a stepped screw 23. The rotation of the oscillator wheel 24 causes the reciprocation of spool 27 via an upstanding pin or projection 29 eccentrically formed integral with the wheel, which slides transversely back and forth in a groove 31 in a T-shaped oscillator piece 26 secured to the axially slidable spool shaft 28 by a screw 30. The shape of the oscillator piece 26 and the disposition of the eccentric pin 29 in the groove 31 is best shown in FIG. 2. Since the rotor 20 is rotated with the slippage provided by the drag mechanism while the spool 27 is fixed in a reeling out operation, the fishing line twistedly wound on the spool 27 recovers its straightness when it is reeled out, whereby any twisting of the line is prevented when it is reeled out.

In the spinning reel constructed as described above, the drag operation is effected by threadedly advancing the control knob 14 to slide the drag control shaft 11 relative to the hollow shaft 1, causing the disc member 12 to press the rotor drive wheel 17 together with the washers 16 and 18 onto the anti-reversing gear 6 against the biasing force of the spring 19, whereby the slippage of the rotor drive wheel 17 relative to the anti-reversing gear 6 is controlled.

It is therefore apparent that there has been provided in accordance with the present invention, a simple and rugged spinning reel which has a delicate drag operation with the fishing line untwisted when it is released that fully satisfies the object set forth above, and which has a simplified and yet effective spool oscillation mechanism. Further, a balanced mechanical arrangement is provided wherein the rotor drive wheel and the oscillator wheel are disposed opposite each other and rotate in opposite directions. This serves to effectively cancel a significant degree of the rotational inertia forces generated during the operation of the reel and provide for a much smoother winding operation, particularly during start-up when the gears are rapidly accelerating.

What is claimed is:

1. A spinning reel including a spool, a spool shaft connected thereto, a rotor, a reel housing, a handle and a spool reciprocating means, comprising:
    (a) a hollow shaft rotatably supported by said reel housing, said hollow shaft having one end formed with an anti-reversing gear and a support disc extending inwardly from and coaxially with said gear, and the other end fixed to said handle,
    (b) a drag control shaft slidably supported in said hollow shaft, said drag control shaft having an inner end formed with a disc member positioned in parallel with said anti-reversing gear, and an outer end formed with a thread,
    (c) a rotor drive wheel disposed between said anti-reversing gear and said disc member and fitted on said support disc, said rotor drive wheel beng meshed with a pinion to rotate said rotor, and said spool shaft being slidably fitted in said pinion,
    (d) a resilient means disposed between said disc member and said rotor drive wheel for spring-biasing said disc member to urge the rotor drive wheel toward said anti-reversing gear,
    (e) a drag control knob threadingly engaged with said thread portion of said drag control shaft, said knob being contacted with said hollow shaft to move said disc member for controlling the biasing force of said resilient means to thereby control slippage of said rotor drive wheel relative to said anti-reversing gear,
    (f) a spool oscillation gear rotatably secured to said reel housing at a position symmetrical with said rotor drive wheel and on the opposite side of the spool shaft therefrom, said spool oscillation gear being meshed with said pinion and rotatable in a reverse direction from that of said rotor drive wheel,
    (g) a pin member extending upwardly from said oscillation gear, and
    (h) an oscillating piece fixedly secured to said spool shaft, said oscillating piece being formed with a groove at a lower surface thereof adapted to slidingly receive said pin member.

2. A spinning reel as defined in claim 1 wherein the diameter of said support disc is less than that of said anti-reversing gear.

3. A spinning reel as defined in claim 1 further comprising a drag washer interposed between said anti-reversing gear and said rotor drive wheel for preventing the rotor drive wheel from being freely rotated relative to the anti-reversing gear but for allowing frictional rotation of the rotor drive wheel when excessive force is applied thereto.

4. A spinning reel as defined in claim 3 further comprising a second drag washer interposed between said resilient means and and said rotor drive wheel for receiving the biasing force of said resilient means.

5. A spinning reel as defined in claim 1, wherein said resilient means is an annular leaf spring.

6. A spinning reel as defined in claim 1, wherein said pin member is integral with said spool oscillation gear.

7. A spinning reel as defined in claim 1, wherein said oscillation piece extends in a direction perpendicular to said spool shaft and said groove is linearly formed in said lower surface of said oscillating piece and reciprocatingly engages said pin member.

* * * * *